United States Patent [19]

Gardiner

[11] 3,899,434

[45] Aug. 12, 1975

[54] HYDROXYLATED POLYMERS USEFUL AS ADDITIVES FOR FUELS AND LUBRICANTS

[75] Inventor: John Brooke Gardiner, Mountainside, N.J.

[73] Assignee: Exxon Research and Engineering Company, Linden, N.J.

[22] Filed: Oct. 1, 1973

[21] Appl. No.: 402,609

[52] U.S. Cl.................... 252/52 R; 44/62; 44/77; 252/54; 252/55
[58] Field of Search.............. 252/52, 54, 55; 44/62, 44/55, 77

[56] References Cited
UNITED STATES PATENTS

| | | | |
|---|---|---|---|
| 3,388,067 | 6/1968 | Takashima et al................ | 252/52 R |
| 3,388,977 | 6/1968 | Burkard et al...................... | 44/77 X |

*Primary Examiner*—Delbert E. Gantz
*Assistant Examiner*—Andrew H. Metz
*Attorney, Agent, or Firm*—Frank T. Johmann

[57] ABSTRACT

Hydroxylated polymeric additives useful as additives, for example as dispersants for lubricants and hydrocarbon fuels, and multi-functional dispersant-viscosity index improvers for lubricants, can be prepared by the reaction of metal salts of polyols with a halogen containing olefin polymer, particularly ethylene containing polymers, such as: the halogenated terpolymer of ethylene, a $C_3$ to $C_{18}$ straight or branched chain α-olefin and a $C_5$ to $C_{14}$ acyclic or alicyclic nonconjugated diolefin; a terpolymer of ethylene, a $C_3$ to $C_{18}$ alpha olefin and a $C_5$ to $C_{14}$ halogen-containing olefin; halogenated copolymers of ethylene and a $C_3$ to $C_{18}$ straight or branched chain α-olefin; etc.

7 Claims, No Drawings

HYDROXYLATED POLYMERS USEFUL AS ADDITIVES FOR FUELS AND LUBRICANTS

BACKGROUND OF THE INVENTION

1. Field of the Invention

This invention relates to oil soluble hydroxylated olefin polymers, e.g., the hydroxylated reaction products of halogen containing polymers with polyol metal salts, a method for their preparation, and to compositions comprising a major proportion of a fuel or lubricant and a minor proportion of said hydroxylated polymer as a sludge dispersant and/or V.I. improver. More preferably this invention relates to copolymers of ethylene and higher $\alpha$-olefins and to terpolymers comprising ethylene, a higher $\alpha$-olefin and a nonconjugated diolefin, which have been halogenated or hydrohalogenated, and then hydroxylated by reaction with a metal salt of a polyol. Alternatively, in the synthesis of the terpolymer, the nonconjugated diene may be replaced in whole or in part by an acyclic or alicyclic halo-olefin to thereby directly give the halogen containing polymer which is then reacted with said metal salt.

2. Prior Art

Compositions comprising polymeric or high molecular weight materials which incorporate hydroxyl groups have been described in U.S. and foreign patents as dispersants and/or viscosity index improvers for fuels and/or lubricants. For example:

U.S. Pat. No. 3,621,004 discloses lubricant additives containing hydroxylated polymers formed by copolymerizing ethylene, alkyl ($C_8$–$C_2$) methacrylates, and $\beta$-hydroxyethyl methacrylate as viscosity index improvers and sludge dispersants.

U.S. Pat. No. 3,687,849; German Pat. No. 1,929,811; and Canadian Pat. No. 728,709, disclose lubricant compositions containing hydroperoxidized olefin copolymers with grafted hydroxy monomers such as allyl alcohol, $\beta$-hydroxyethyl methacrylate, and vinyl acetate (hydrolyzed subsequently to vinyl alcohol groups) which act as ash free sludge dispersants.

U.S. Pat. No. 3,642,633 discloses lubricant compositions containing terpolymers of vinyl toluene, a mixture of lauryl and stearyl methacrylate, and $\beta$-hydroxyethyl methacrylate; or terpolymers containing methacrylic acid ethoxylated to $\beta$-hydroxyethyl methacrylate; which terpolymers are pour depressants, viscosity index improvers, and sludge dispersants.

U.S. Pat. No. 3,388,067 discloses lubricant additives containing hydroxylated ethylene-propylene rubbers made by reduction of hydroperoxidized (by a hydroperoxide) polymer.

U.S. Pat. No. 3,381,022 discloses lubricant additives made by the reaction of alkenyl succinic anhydride and polyalcohols as sludge dispersants.

SUMMARY OF THE INVENTION

It has now been found that highly effective dispersants, and multifunctional dispersant-viscosity index improvers, for fuels and lubricants, are the reaction products of halogen containing ethylene $\alpha$-olefin copolymers, e.g., a halogenated or hydrohalogenated copolymer of ethylene and a $C_3$–$C_{18}$ alpha olefin, or terpolymer of ethylene, a $C_3$ to $C_{18}$ straight or branched chain $\alpha$-olefin and a $C_5$ to $C_{14}$ acyclic or alicyclic nonconjugated diolefin, with the metal salt of a polyol.

The halogen in the halogenated or hydrohalogenated polymer is either on the backbone carbon atoms, or can be external to the backbone chain of carbon atoms. The halogen can be incorporated into the polymer by halogen replacement of a hydrogen, or in the terpolymer, by: addition of halogen or halogen halide to an olefinic double bond in a hydrocarbon moiety which is pendant to the backbone chain of carbon atoms, or by allylic halogenation of a similarly located olefinic double bond. Alternatively, the halogen can be incorporated directly in a terpolymer by using a $C_5$ to $C_{14}$ halogen-containing olefin in place of part or all of the above-noted diolefin.

DESCRIPTION OF THE PREFERRED EMBODIMENTS

THE POLYMER

Copolymers of ethylene and higher $C_3$–$C_{18}$ $\alpha$-olefins, which can be halogenated for use in the invention, will generally comprise about 30–85 mole % ethylene and 70–15 mole % higher $\alpha$-olefin. Ethylene-$C_3$ to $C_{18}$ $\alpha$-olefin-$C_5$ to $C_{14}$ nonconjugated diolefin terpolymers, which are to be halogenated or hydrohalogenated will generally comprise about 30 to 84.5 mole % ethylene; about 15 to 69.5 mole % of the higher $C_3$ to $C_{18}$ olefin, and about 0.5 to 20 mole % of the diolefin. Preferred are polymers of 40 to 70 mole % ethylene, 20 to 58 mole % of the higher olefin and 2 to 10 mole % of diolefin. On a weight basis usually at least 2 or 3 wt. % of the terpolymer will be the diolefin. Mixtures of monoolefins and/or mixtures of diolefins can be used.

Alternatively, a $C_5$ to $C_{14}$ halogen-containing monomer can be directly incorporated in the terpolymer during synthesis by substituting the $C_5$ to $C_{14}$ halogen-containing monomer for any part or all of the $C_5$ to $C_{14}$ diolefin in the above-mentioned terpolymer compositions.

Examples of the above-noted higher $C_3$–$C_{18}$ alpha monoolefins include propylene, 1-butene, 1-pentene, 1-hexene, 1-heptene, 1-decene, 1-dodecene, 1-heptadecene, etc. Preferred are the $C_3$–$C_8$ monoolefins, particularly propylene.

Representative non-limiting examples of the nonconjugated diolefins include:

A. Straight chain acyclic dienes such as: 1,4-hexadiene, 1,5-heptadiene, 1,6-octadiene.

B. Branched chain acyclic dienes such as: 5-methyl-1, 4-hexadiene; 3,7-dimethyl 1,6-octadiene; 3,7-dimethyl 1,7-octadiene; and the mixed isomers of dihydromyrcene and dihydroocimene.

C. Single ring alicyclic dienes such as: 1,4-cyclohexadiene; 1,5 -cyclo-octadiene; 1,5-cyclododecadiene; 4-vinyl-cyclohexene; 1-allyl 4-isopropylidene cyclohexane; 3-allyl-cyclopentene; 4-allyl cyclohexene and 1-isopropenyl 4(4-butenyl) cyclohexane.

D. Multi-single ring alicyclic dienes such as: 4,4'-dicyclopentenyl and 4,4'-dicyclohexenyl dienes.

E. Multi-ring alicyclic fused and bridged ring dienes such as: tetrahydroindene; methyl tetrahydroindene; dicyclopentadiene; bicyclo(2,2,1) hepta 2,5-diene; alkenyl, alkylidene, cycloalkenyl and cycloalkylidene norbornenes such as: 5-methylene-2-norbornene; 5-ethylidene-2-norbornene; 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexylidene-2-norbornene.

A variety of acyclic or alicyclic halo-olefins having 1 or 2 halogens may be employed as monomers, provided the halogen in the compound is sufficiently stable so as not to be removed or interfere with the polymerization. Suitable nonlimiting examples of halo-olefins include: 5-chlorohexene-1; 3-(1-chloroethyl) pentene-1; 4-(1-chloroethyl) hexene-1; 5-chloromethyl norbornene-2 and 3-chloro,3,4-dihydrodicyclopentadiene etc., 5-chloromethyl or 5-bromomethyl norbornene-2 which is readily prepared from allyl chloride or allyl bromide and cyclopentadiene or dicyclopentadiene by a Diels-Alder synthesis is particularly preferred.

In general, the preparation of copolymers or terpolymers suitable for the practice of this invention by means of Ziegler-Natta catalysts is known in the prior art, for example see U.S. Pat. Nos. 2,933,480; 3,000,866; and 3,093,621. These polymers which are primarily produced for use in elastomeric compositions, are usually characterized by the substantial absence of chain or backbone unsaturation, and when made from non-conjugated dienes contain sites of unsaturation in groups which are pendant to or are in cyclic structures outside the main polymer chain. Ethylene-propylene copolymers and ethylene-propylene-non-conjugated diolefin terpolymers are known articles of commerce. In fact, various examples of such commercially available copolymers or terpolymers are VISTALON, an elastomeric copolymer of ethylene and propylene, or terpolymer of ethylene, propylene and 5-ethylidene, 2-norbornene, marketed by Exxon Chemical Co., New York, N.Y., and NORDEL, a terpolymer of ethylene, propylene and 1,4-hexadiene, marketed by E. I. du Pont De Nemours & Co., Wilmington, Del.

In general, the catalyst compositions used to prepare these polymers comprise a principal catalyst consisting of a transition metal compound from Groups IV$b$, V$b$ and VI$b$ of the Periodic Table of the Elements, particularly compounds of titanium and vanadium, and organometallic reducing compounds from Groups II$a$, II$b$ and III$a$, particularly organoaluminum compounds which are designated as cocatalysts. Preferred principal catalysts of vanadium have the general formula VO$_z$X$_t$ wherein $z$ has a value of zero or one and $t$ has a value of 2 to 4. X is independently selected from the group consisting of halogens having an atomic number equal to or greater than 17, acetylacetonates, haloacetylacetonates, alkoxides and haloalkoxides. Non-limiting examples are: VOCl$_3$; VO(AcAc)$_2$; VOCl$_2$(OBu); V(AcAc)$_3$; and VOCl$_2$(AcAc) where Bu is n-butyl or isobutyl and (AcAc) is an acetylacetonate.

Preferred cocatalysts have the general formula AlR'$_m$X'$_n$ wherein R' is a monovalent hydrocarbon radical selected from the group consisting of C$_1$ to C$_{12}$ alkyl, alkylaryl, arylalkyl and cycloalkyl radicals, X' is a halogen having an atomic number equal to or greater than 17, $m$ is a number from 1 to 3 and the sum of $m$ and $n$ is equal to three. Non-limiting examples of useful cocatalysts are: Al(Et)$_3$; Al(IsoBu)$_3$; Et$_2$AlCl; EtAlCl$_2$ and Et$_3$Al$_2$Cl$_3$.

Synthesis of the polymers, which may be conducted in batch, staged or continuous reactors, are preferably run in the presence of a purified solvent such as hexane which has been percolated thru LINDE 3A catalyst and in the absence of moisture, air or oxygen and catalyst poisons. An atmosphere of oxygen-free nitrogen is preferably maintained above the reactants. Monomers, principal catalyst and cocatalyst are fed to the reactor supplied with means for withdrawing the heat of reaction and maintained under controlled agitation for a time, temperature and pressure sufficient to complete the reaction.

Suitable times of reaction will generally be in the range from 1 to 300 minutes, temperatures will usually be in the range of 0°C. to 100°C. and pressures from atmospheric to 160 psig are generally used. Monomer feed to the reactor per 100 parts by weight of solvent may be in the range of: ethylene, 2 to 20 parts by weight; C$_3$ to C$_{18}$ $\alpha$-olefin, 4 to 20 parts by weight; and nonconjugated diene or halo-olefin, when used 0.1 to 10 parts by weight.

Principal catalyst, VOCl$_3$ for example, prediluted with solvents is fed to the reactor so as to provide a concentration in the range of 0.1 to 5.0 millimoles per liter. Cocatalyst, for example Et$_3$Al$_2$Cl$_3$ is at the same time fed to the reactor in an amount equal to from 2.0 to 20.0 moles of cocatalyst per mole of principal catalyst.

The polymers may have molecular weights $\bar{M}_n$ of about 1000 to 500,000; preferably 10,000 to 200,000; and usually about 20,000 to 100,000. In general, polymers having a narrow range of molecular weight, as determined by the ratio of weight average molecular weight ($\bar{M}_w$) to number average molecular weight ($\bar{M}_n$) are preferred. Polymers having a $\bar{M}_w/\bar{M}_n$ of less than 10, preferably less than 7, and most preferably 4 or less are most desirable. Polymers in this range may be obtained by a choice of synthesis conditions such as choice of principal catalyst and cocatalyst combination and addition of hydrogen during the synthesis. Post synthesis treatment such as extrusion et elevated temperature and under high shear through small orifices, and fractional precipitation from solution may also be used to obtain narrow ranges of desired molecular weights. for a comprehensive review of the art see: "Polymer Chemistry of Synthetic Elastomers," edited by Kennedy and Tornqvist, Interscience, N.Y. 1969.

While these polymers are essentially amorphous in character by superficial inspection, they may contain up to 25 percent weight of crystalline segments as determined by X-ray or differential scanning calorimetry. Details of these methods for measurement of crystallinity are found in J. Polymer Sci. A-2, 9, 127 (1971) by G. VerStrate and Z. W. Wilchinsky.

Structurally, the polymers suitable for conversion to halides, dihalides, hydrohalides or allylic halides for the practice of this invention may be illustrated as copolymers or terpolymers in which the following monomer moieties are linked in the polymer chain in a random sequence and in a varying number, as typified by the following structures:

1. 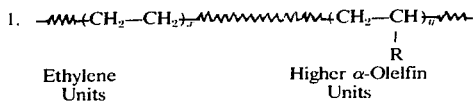

Ethylene Units     Higher $\alpha$-Olefin Units

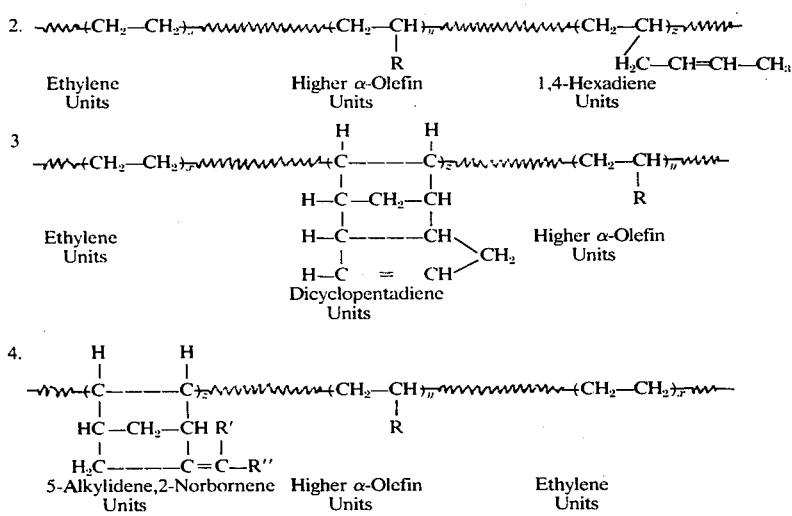

Wherein R is a $C_1$ to $C_{16}$ straight or branched chain alkyl radical, R' and R" are independently selected from the group consisting of hydrogen and $C_1$ to $C_6$ alkyl radicals, and $x$, $y$ and $z$ are cardinal numbers, typically in the range of 1 to 100. It will be understood that the numerical values assigned to $x$, $y$ and $z$ are not necessarily totals for any monomer in the polymer but that these numerical values express the number of times a given monomer may be repeated in the polymer chain before another monomer is interposed in the chain.

Halogenated terpolymers may also be produced by direct synthesis, using a halo-olefin as third monomer, replacing the aforesaid non-conjugated diene in whole or in part. An illustration of such a terpolymer follows:

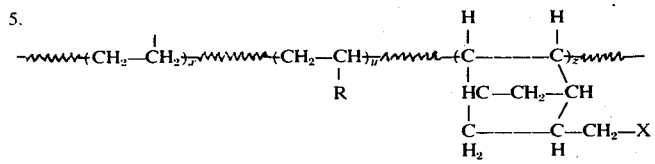

wherein R is a $C_1$ to $C_{16}$ alkyl radical; $x$, $y$ and $z$ are cardinal numbers in the range of 1 to about 100; and X is Cl or Br.

Halogenation of The Polymers

The halogenation of the polymers can be carried out by dissolving the polymers in an inert solvent and adding gaseous chlorine or bromine, or liquid bromine, etc., at 0° to 120°C. More specifically, the halogenation, or hydrohalogenation can be carried out by simply dissolving the polymer in a solvent, preferably a solvent substantially inert to the halogen meterial, and adding halogen, e.g., gaseous chloride, liquid bromine, or a hydrohalogen, e.g., HCl or HBr gas, into the solution, preferably at rather low temperatures, e.g., 0° to 120°C. Primarily depending on the amount of halogen added and the number of double bonds available, 0.1 to 7.0, e.g., 0.3 to 4.0 wt. % halogen, e.g., Cl or Br, based on the weight of halogen containing polymer, can be added to the polymer. Hydrogen is replaced by halogen in copolymer halogenation. In the halogenation of terpolymer, the bromine tends to react by addition, while the chlorine tends to be incorporated by allylic reaction. If the reaction is carried out in an inert volatile solvent, then a non-volatile oil can be later added to the reaction product solution and the volatile solvent evaporated to thereby form an oil concentrate of the halogen containing polymer for further handling. Alternatively, isolation of the halogenated polymer may be readily carried out, e.g., by precipitation in media such as acetone or isopropanol or by stripping with steam, etc.

In general, these techniques are known in the art; for example bromination of terpolymers of ethylene, a $C_3$ to $C_8$ $\alpha$-olefin and a $C_5$ to $C_{14}$ non-conjugated diolefin is illustrated in U.S. Pat. No. 3,524,826.

Non-limiting examples of halogenated, hydrohalogenated and allylically halogenated polymers of the invention may be illustrated structurally as:

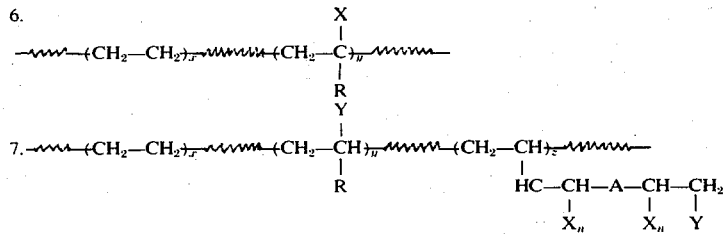

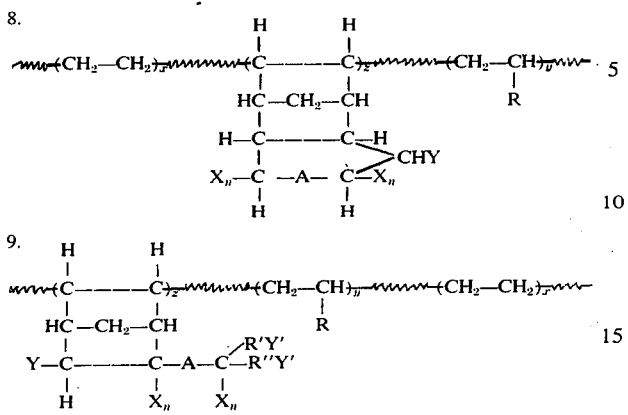

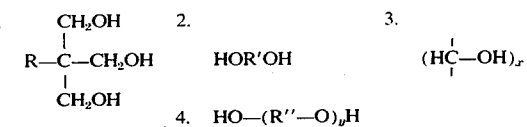

wherein R is a $C_1$ to $C_{16}$, preferably $C_1$ to $C_6$, straight or branched chain alkyl radical; R' and R'' are independently selected from the group consisting of hydrogen and $C_1$ to $C_6$ aliphatic hydrocarbon radicals; $x$, $y$ and $z$ are cardinal numbers in the range of 1 to about 100; X, Y and Y' are independently selected from the group consisting of hydrogen, chlorine and bromine; A is a carbon to carbon single bond when Y and Y' are hydrogen and $n$ is equal to 1. When A is a carbon to carbon double bond and $n$ is 0, then Y can be chlorine or bromine and Y' can be hydrogen, or Y' can be chlorine or bromine and Y can be hydrogen.

Polyol Metal Salt

Formation of the metal salt of the polyol, i.e., the alcoholate, can be accomplished by adding the pure metal, e.g., sodium, in small pieces to the polyol in a polar solvent. This is well known to the art. The reaction is carried out under dry nitrogen and the polyol and solvent should also be dry. The reaction proceeds by liberating hydrogen and forming the alcoholate as shown below:

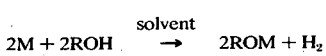

Preferably, just enough metal is used to metallate one hydroxyl group of a polyol in most cases.

Alcoholates can also be prepared by disproportionation reactions as follows:

if one of the resulting alcohols can be removed.

In general, useful metal salts of alcohols include salts of polyols, i.e., polyhydric alcohols, having in the range of 2 to 12, preferably 2 to 6, and most preferably 3 to 6, hydroxyl groups and in the range of 2 to 200, preferably 2 to 24 carbon atoms per molecule.

Preferred polyol for making the salts are aliphatic saturated polyols and include those of the general formulae:

wherein R can be independently selected from the group consisting of hydrogen, $C_1$ to $C_{20}$ straight or branched chain alkyl radicals, methylol, hydroxy alkyl radical, pentaerythritol radical, or other polar substituents such as amine, chlorine, nitro, nitrile, etc. R' can be a $C_2$ to $C_{20}$ straight or branched chain, or alicyclic alkyl radical. R'' is usually a $C_2$ or $C_3$ alkylene group, but can be $C_4$ and higher alkylene groups; $x$ and $y$ can vary from 1 to 50.

Non-limiting examples of polyols include: ethylene glycol; propylene glycol (1,2 or 1,3); (1,4) butylene glycol; cyclohexene glycol; glycerine, mannitol; sorbitol, dextrose; sucrose; other sugars; diethylene glycol; dipropylene glycol; polyethylene and polypropylene glycols; pentaerythritol; di or poly pentaerythritols; trimethylol methane, ethane, or propane; trimethylol nitro, chloro, nitrilo, or amino methane; neoalkyl glycols, etc. Pentaerythritol is most preferred.

Metal components of the alcohol salts are those metals that form alcoholates. Preferred are alkali metals such as sodium, potassium and lithium; and alkaline earth metals such as magnesium, calcium, strontium and barium. Most preferred are the alkali metals, particularly sodium.

Halogen Containing Polymer — Metal Salt Reaction

Reaction of the halo-polymer, usually dissolved in a solvent or diluent oil, with the metal salt component will generally be carried out at a temperature in the range of 100°C. to 210°C., for about 1 to 100 hours, at atmospheric pressure. The metal salt is kept dry until used and exposed to moisture as little as possible in the transfer to the reactor. It is desirable to maintain an inert atmosphere such as nitrogen in the reaction mixture. Any solid reaction products formed can be later removed by centrifuging or filtration at the end of the reaction. By carrying out the reaction in the presence of an oil, an oil concentrate of the hydroxylated product will be formed which can then be used directly as an additive. Of course, if desired, the hydroxylated product per se can be recovered by carrying the reaction out in a volatile solvent, which is later evaporated. About 10 to 100%, e.g., 30 to 90 mole % of the halogens available may be replaced by hydroxylated groups to give a final product with 0.1 to 15.0 wt. %, preferably 0.2 to 10 wt. % oxygen based on the hydroxylated polymer per se. Frequently the hydroxylated polymer may also contain 0 to 3 wt. % of halogen remaining after reaction. Any remaining halogen would contribute mild e.p. properties.

The Compositions

The hydroxylated oil soluble reaction products of this invention can be incorporated in lubricating oil compositions, e.g., automotive crankcase lubricating oils, in concentrations within the range of about 0.01 to 10 weight percent, e.g., 0.1 to 7 weight percent, preferably 0.3 to 3.0 weight percent, of the total composition. The lubricants to which the hydroxylated products of this invention can be added include not only hydrocarbon oils derived from petroleum but also include synthetic oils such as alkyl esters of dicarboxylic acids; complex esters of dicarboxylic acids, polyglycols and alcohols; organic esters of phosphoric acids, polysilicone oil, etc.

When the products of this invention are used as dispersants in fuels such as gasoline, kerosene, diesel fuels, No. 2 fuel oil and middle distillates, a concentration of the additive in the fuel in the range of 0.001 to 0.5, preferably about 0.001 to 0.1 weight percent, based on the weight of the total composition, will usually be employed.

The additive may be conveniently dispensed as a concentrate comprising a minor proportion of the additive, e.g., 10 to 45 parts by weight, dissolved in a major proportion of a mineral lubricating oil, e.g., 90 to 45 parts by weight, with or without other additives being present.

In the above compositions or concentrates, other conventional additives may also be present, including dyes, pour point depressants, antiwear agents such as tricresyl phosphate or zinc dialkyl dithiophosphates of 3 to 8 carbon atoms, antioxidants such as N-phenyl α-naphthylamine, tert. octyl phenol sulfide, 4,4'-methylene bis(2,6-di tertbutyl phenol), viscosity index improvers such as ethylenepropylene copolymers, polymethacrylates, polyisobutylene, alkyl fumarate-vinyl acetate copolymers and the like, as well as other ashless dispersants, detergents and viscosity index improvers, etc.

This invention will be further understood by reference to the following examples, which include preferred embodiments of the invention.

Halogenation of Polymers

The following oil soluble random terpolymers, all of which were substantially amorphous, were halogenated.

Polymer A was a terpolymer of about 49 wt. % ethylene, 9.7 wt. % 5-ethylidene norbornene-2 and the remainder propylene. It had a $\bar{M}_n$ (number average molecular weight) of about 65,000 and a $\bar{M}_w/\bar{M}_n$ ratio of about 3 to 3.5.

Polymer B comprised about 50 wt. % of ethylene, 3.8 wt. % of 5-ethylidene norbornene-2 and the remainder propylene. It had a $\bar{M}_n$ of about 50,000 and a $\bar{M}_w/\bar{M}_n$ ratio less than 4.

Polymer C comprised about 53 wt. % of ethylene, 3.5 wt. % of 1,4-hexadiene and the remainder propylene. It had an estimated $\bar{M}_n$ molecular weight of approximately 50,000.

Polymer D comprised 53 wt. % of ethylene, 7.5 wt. % of 5-ethylidene norbornene-2 and the remainder propylene. This polymer had a number average molecular weight of about 7500.

Polymer E comprised 46 wt. % of ethylene and 54 wt. % of propylene. The polymer had a number average molecular weight of about 55,000.

EXAMPLE 1

In a flask, 560 gms. of Polymer A was dissolved in 7440 gms. of heptane by stirring at room temperature to make a 7 wt. % solution of Polymer A in heptane.

A reaction flask was then charged with 2,680 gms. of said 7 wt. % solution and heated to 60°C. with stirring. Ten gms. of chlorine (as determined by noting the change in weight of the chlorine cylinder used to supply the chlorine) was bubbled into the solution over a period of an hour while stirring. Nitrogen was then bubbled through the flask overnight to evaporate the heptane. 2,680 gms. of Solvent 150 Neutral (neutral lubricating oil of 150 SUS. viscosity at 100°F.) was added and heated at 100°C. for 24 hours to give an oil solution. A sample was freed from the oil by dialysis through a rubber membrane and contained 2.27 wt. % chlorine.

EXAMPLE 2

560 gms. of Polymer B was dissolved in 7400 gms. of heptane in a 12 liter flask equipped with a heating mantle, mechanical stirrer, inlet for chlorine, a sodium hydroxide scrubber consisting of 20 gms. of a 50 wt. % solution of sodium hydroxide dissolved in water, and a thermometer. The composition was stirred at room temperature, e.g., about 77°F. and allowed to mix over a two-day weekend. The heat was turned on and the temperature rose to about 80°C. About 1,750 ml. of material was removed from the flask as the flask was too full. The heat was then maintained in the range of about 75° to 85°C. and chlorine addition was begun. A total of 12.2 gms. of chlorine was added over a period of time of about 40 minutes. Following this, a slow nitrogen sparge was carried out overnight at about 90°C. The following day, the dissolved chlorinated composition was removed from the reaction flask. A portion of the composition was then stripped from heptane by blowing with nitrogen on a steam bath. Analysis of the chlorinated polymer residue indicated 1.35 wt. % chlorine content.

EXAMPLE 3

780 gms. of POlymer C was dissolved in a mixture of 5,000 gms. of heptane and 5,360 gms. of hexane by stirring at room temperature for 48 hours. 3316 gms. of the resulting polymer cement was placed in a 5 liter flask equipped with a thermometer, condenser, nitrogen sparge, chlorine inlet and a stirrer. The flask was then heated to a temperature in the range of about 50° to 55°C. and 14.5 gms. of chlorine was added over a 30 minute period. The resulting solution was a bright yellow. Following this, the solution was sparged with nitrogen for about 12 hours while maintaining the temperature at 40°C. Heat was applied and the solvent was evaporated from the mixture at a temperature ranging from 60°C. to 120°C. As the solvent was coming off during evaporation, 3,060 gms. of a low pour point Solvent 150 Neutral mineral oil of about 150 SUS viscosity at 100°F., was added. The evaporation and the periodic addition of the Solvent 150 Neutral was carried out over a total of about 16 hours during which time the temperature climbed to a final point of 150°C. Some darkening occurred during the last 3 or 4 hours while the temperature was in the general range of about 120° to about 150°C. Analysis indicated that the chlorinated polymer contained about 2.44 wt. % chlorine.

EXAMPLE 4

To a 10 gal. reactor there was added 1283 gms. of Polymer B along with 17,050 gms. of hexane. This mixture was heated with stirring to about 50°C. for 24 hours followed by stirring for an additional 48 hours at about 23°C. The polymer dissolved to form a polymer cement of about 7 wt. % polymer.

A first batch of 7400 gms. of the polymer cement was chlorinated with 8.4 gms. of chlorine at 60°C. over a period of about one-half hour. Following this, the hexane was stripped off by bubbling nitrogen through while simultaneously Solvent 150 Neutral low cold test oil was added. It took about 3 to 4 hours at temperatures in the range of 70° to 120°C. to strip off the hexane and to add the oil. Following this, the mixture was then nitrogen sparged at 80°C. overnight. A second batch of 7,400 gms. of polymer cement was similarly treated except that 5.2 gms. of chlorine was added at 65°C. Two batches were combined. A sample of the oil solution was dialized to remove the oil, and the chlorinated polymer per se analyzed for chlorine. It had 0.82 wt. % chlorine.

EXAMPLE 5

10,000 ml. of a 7 wt. % solution of Polymer B in hexane was placed in a 12 liter flask heated to 60°C., and 25.2 gms. bromine dissolved in 100 ml. of hexane was added to the batch over a period of 1 hour, with stirring. The mixture was nitrogen sparged at 60°C. for 1 hour. Solvent was evaporated from the flask by the nitrogen sparging while heating, while Solvent 150 Neutral oil was periodically added to keep the level of the liquid even in the flask. The solvent was continuously removed until the temperature climbed to 120°C. The resulting oil solution was a clear dark brown with a slight trace of haze. The brominated polymer per se contained 4.3 wt. % based on the polymer.

EXAMPLE 6

672 gms. of Polymer B was dissolved in 8928 gms. of Solvent 100 Neutral mineral lubricating oil (100 SUS at 100°F.) in a 12 liter flask equipped with a mechanical stirrer, inlet for Cl, a sodium hydroxide scrubber and a thermometer. A total of 15 gms. of chlorine was added over a period of about 1 hour and 15 minutes while stirring and maintaining the temperature in the range of about 60°–64°C. The composition was then sparged with nitrogen overnight and the following day additional chlorine amounting to another 12.5 gms. was added over a period of 45 minutes while maintaining the temperature at 60°C. The resulting composition was then blown with nitrogen sparging over a weekend. The polymer contained 0.77 wt. % chlorine.

EXAMPLE 7

10,000 ml. of a 7 wt. % solution of Polymer B in hexane was placed in a 12 liter flask and a total of 7.2 gms. of bromine was added at 30°C. in the same manner as described with regard to Example 5 and worked up in the same manner. The brominated polymer contained 1.54% bromine.

EXAMPLE 8

710 gms. of Polymer D was dissolved in 1633 gms. of hexane while stirring overnight with warming. The material was then added to a 5 liter flask and excess hexane added. 32.3 gms. of chlorine was added over a period of about 1½ hours at 50°C. followed by nitrogen sparging at 1 hour at 50°C. Following this, 800 gms. of Solvent 100 Neutral oil was added with heating and sparging while the hexane was taken overhead. Finally another 830 gms. of Solvent 100 Neutral oil was added with heating and sparging while the hexane was taken overhead; the sparging continued at room temperature overnight. The following morning the solution was heated at 120°C. with vigorous nitrogen sparge for an additional hour. The theoretical chlorine content was 2.4 wt. % chlorine.

EXAMPLE 9

279 gms. of a solution, previously formed by dissolving 1750 gms. of Polymer B in 23,250 gms. of hexane, was added to a flask. 83.5 gms. of a white oil (mineral oil) was added in a first stage formed by an addition of 192 gms. of additional white oil while nitrogen blowing in order to evaporate hexane. The mixture was then heated to 60°C. and 0.7 gms. of chlorine was added over 40 minutes at 60°–63°C. The mixture was then stirred for one-half hour followed by stripping for an additional 1½ hours at a temperature of 60°–65°C. while maintaining a high nitrogen sparging rate. Analysis showed that the polymer per se contained 0.95 wt. % chlorine.

EXAMPLE 10

8,000 gms. of a solution, previously formed by dissolving 1500 gms. of Polymer E in enough hexane to make a 7.1 wt. % solution, was added to a flask. At room temperature, 25.2 gms. of bromine in 50 ml. of pentane was added over 1 hour. The flask was heated to 40°C. for 1 hour and the red bromine color disappeared. The contents were sparged with nitrogen for 30 minutes at 40°C. and then slowly overnight at room temperature. The hexane wax replaced with Solvent 100 Neutral oil by sparging with nitrogen and heating. The theoretical bromine content was 4.25 wt. %.

EXAMPLES 11 to 16

Synthesis of Halogenated Terpolymers

Six terpolymers comprising ethylene, propylene and 5-chloromethyl bicyclo(2,2,1)heptane-2 were synthesized with the aid of a Ziegler-Natta catalyst combination comprising $VOCl_3$-$Et_3Al_2Cl_3$ in an Al/V molar ratio of 5 to 1. All runs were made at 35°C. for a residence time in the reactor of 13.3 minutes, using a $VOCl_3$ + $Et_3Al_2Cl_3$ catalyst concentration of 0.010 pounds per 100 pounds of hexane solvent, and with a hydrogen feed of 20 ppm per part of ethylene feed by weight. The reaction was carried out by continuously feeding the reactants, solvent, catalyst, etc., to the reactor and withdrawing a stream which contained the polymer. The rate of feed of monomer, yields in pounds of polymer per pound of vanadium, and composition of the polymer product are summarized in the following table.

TABLE I

Synthesis of Halogenated Terpolymers

| Examp. No. | lbs Feed/100 lbs Hexane | | | Yield lbs/lb V | Polymer Composition | |
|---|---|---|---|---|---|---|
| | $C_2^=$ | $C_3^=$ | ClMN(1) | | Wt.% $C_2^=$ | Wt.% ClMN(2) |
| 11 | 2.5 | 12.0 | 1.0 | 255 | 58.3 | 5.0 |
| 12 | " | " | 2.0 | 116 | 63.6 | 10.0 |
| 13 | " | " | 1.0 | 317 | 54.7 | 6.1 |
| 14 | " | " | 2.0 | 260 | 57.4 | 16.8 |
| 15 | " | " | 1.0 | 402 | 52.6 | 5.6 |
| 16 | " | " | 2.0 | 291 | 59.4 | 10.0 |

$C_2^=$ is ethylene.
$C_3^=$ is propylene.
(1) ClMN is 5-chloromethyl norbornene-2.
(2) From chlorine analysis.

While molecular weight was not determined, prior experience indicated that these terpolymers would have molecular weights in the range of about 30,000 to 70,000 $\bar{M}_n$.

Preparation of Sodium Pentaerythritol, i.e., The Alcoholate

In these examples, a commercial pentaerythritol was used which was about 90% mono, about 8% di and about 1–2% tripentaerythritol.

EXAMPLE 17

100 ml. of dry dioxane was placed in a 250 ml. flask equipped with a bar magnet stirrer. 13.6 gms. of pentaerythritol was added, then 2.3 gms. of sodium in small pieces. The flask was loosely stopped, to allow gas to escape, and was stirred overnight. The next day, the sodium had dissolved and reacted. The excess dioxane was then decanted and the wet solid, i.e., the sodium pentaerythritol (Na-PE salt), used in experiments later described.

EXAMPLE 18

11 gms. (.2 moles) of sodium methoxide was added to 27 gms. (.2 moles) of pentaerythritol in 100 ml. dioxane in a flask. The mixture was stirred overnight. Solvent was slowly distilled off, while adding additional dioxane, to maintain the dioxane level at about 100 ml. over an 8 hour period. By this method, substantially all of the methanol formed by the reaction was removed. The resulting material was a dioxane slurry of the product, which was subsequently used as is.

EXAMPLE 19

11 gms. (.48 moles) of sodium was reacted with 68 grams (0.495 moles) of pentaerythritol in 250 ml. of dimethyl formamide (DMF) under $N_2$ for 20 hours. After the metal dissolved, the DMF was removed by high vacuum and a trap to yield a white powdery product.

EXAMPLE 20

555 gms. of pentaerythritol (4.05 moles) were put in a 5 liter flask with 4 liters of dry DMF. Under $N_2$ with stirring, 92 gms. of sodium (4 moles) cut in pea sized pieces were added. All the sodium reacted in 48 hours. One liter of benzene was added. The solid was filtered off under $N_2$ and washed with 1 gallon of benzene and then 1 gallon of pentane. The powdery white material, i.e., sodium pentaerythritol, was kept in a dry box till used.

Halo-Polymer — Metal Alcholate Reaction Products

A typical reaction of halogenated polymer and the metal alcoholate is carried out as follows:

EXAMPLE 21

About 2000 gms. of a solution containing 7 wt. % of halogenated Polymer A (containing 2.06% Cl) dissolved in Solvent 100 Neutral (mineral lubricating oil of about 100 SUS viscosity at 100°F) is charged to a 5 liter four necked round bottom flask. The flask is put in a nitrogen dry box and allowed to dry overnight. 27 gms. of sodium salt of pentaerythritol of Example 20 is added in the dry box. The flask is removed and set up with a $N_2$ sparge, thermometer, Teflon paddle stirrer and condenser. The flask is heated to 180°C. for 5 hours with strong stirring and nitrogen sparging. The resulting concentrate is faintly hazy, but is cleared, by dilution with hexane, centrifuging in a tube at 3,000 RPM for 20 minutes, decanting the liquid, and evaporating off the hexane with a $N_2$ sparge on a steam bath. The final material is a clear yellow thick concentrate.

EXAMPLES 22 to 39

A series of hydroxylated polymers were formed in the general manner as described in Example 21, but with variation in the reactants, conditions of reaction, e.g., amounts, times, and temperatures, which variations are summarized in Table II.

The resulting products of Examples 22 to 39 were tested for dispersancy ability as follows:

A used automotive mineral lubricating oil, which had an original viscosity of 325 SUS at 100°F., was obtained by pooling the oil drained from the crankcases of a fleet of taxicabs operating in New York City. The used oil is centrifuged in heavy-walled 50 ml. tubes at 16,000 RPM for one-half hour and the clear, supernatant oil decanted for use in the test.

In conducting the test, 100 milligrams of the oil concentrates containing 7 wt. % of the hydroxylated polymers to be tested are weighed into 30 ml. beakers. Ten gms. of the centrifuged oil is added to each beaker and the samples heated on a steam bath with swirling until the additive is completely dissolved and a homogeneous solution is obtained. The contents of each beaker are then transferred to pre-weighed centrifuge tubes and the tubes stored in an oven at 280°F. (138°C.) for 16 hours. The tubes, including a number of blanks to which no additive has been added but which have been heated to 280°F. for 16 hours, are then centrifuged at 16,000 RPM for one-half hour and the supernatant oil decanted and discarded. The tubes are then inverted in a rack and allowed to drain for not more than fifteen minutes, after which the walls of each tube are rinsed with 25 ml. of pentane, taking care not to disturb the sludge compacted in the tip of the tube. A second 25 ml. portion of pentane is added to each tube and the sludge dispersed and any occluded oil dissolved by gentle shaking. The tubes are now centrifuged in an explosion-proof, refrigerated centrifuge at 16,000 RPM for one-half hour, the pentane decanted and discarded. After rinsing the exterior of each tube with acetone, the tubes and contents are allowed to air-dry at room temperature and weighed. The weight of sludge is obtained by difference. The effectiveness of the additive is expressed as the wt. % sludge that is left in the tube as compared to the blank. Thus, 100% would indicate no dispersancy, with the lower percentages indicating dispersancy.

The hydroxylated polymers, their preparation, and their effectiveness as sludge dispersants are summarized in the following Table II:

Examples 23 and 36 were made from halogenated polymers prepared in the manner of Examples 1 and 3 respectively, but were from different batches of these halogenated polymers. In Example 23, 32 grams of the dioxane slurry of the sodium pentaerythritol was used.

TABLE II

PREPARATION OF HYDROXYLATED POLYMERS AND DISPERSANCY RESULTS

| Example | Gm. of 7% SlOON Solution of Halo-Terpolymer | Halo-Polymer of Example | Gm. Na-PE | Preparation of Na-PE, Example | Time, Hours | Temp., °C. | Hydroxyl No. | Dispersancy, % of Blank |
|---|---|---|---|---|---|---|---|---|
| 22 | 200 | 15 | 8** | 17 | 20 | 145 | — | 60 |
| 23 | 200 | 1* | 32*** | 18 | 19 | 135 | 15.2 | 59 |
| 24 | 250 | 4 | 1.20 | 19 | 3 | 150 | 8.9 | 61 |
| 25 | 250 | 4 | 1.20 | 19 | 6 | 150 | 14.1 | 60 |
| 26 | 250 | 4 | 1.20 | 19 | 22 | 150 | 15.1 | 58 |
| 27 | 300 | 4 | 2.30 | 19 | 4 | 180 | 8.4 | 22 |
| 28 | 300 | 4 | 2.30 | 19 | 6 | 180 | — | 36 |
| 29 | 300 | 4 | 2.30 | 19 | 8 | 180 | — | 32 |
| 30 | 300 | 4 | 2.30 | 19 | 10 | 180 | 2.84 | 24 |
| 31 | 300 | 4 | 2.30 | 19 | 12 | 180 | 7.05 | 23 |
| 32 | 40 | 5 | 0.1 | 19 | 1 | 25 | — | — |
| 33 | 300 | 4 | 2.3 | 20 | 4 | 180 | — | 65 |
| 34 | 300 | 4 | 2.3 | 20 | 10 | 180 | — | 64 |
| 35 | 300 | 4 | 2.3 | 20 | 12 | 180 | — | 62 |
| 36 | 300 | 3* | 3.0 | 20 | 7 | 200 | — | 61 |
| 37 | 300 | 3 | 3.0 +(.5 gr. DMF) | 20 | 53 | 150 | — | 56 |
| 38 | 300 | 3 | 3.0 +(0.1 gr. MEOH) | 20 | 12 | 180 | — | 51 |
| 39 | 1800 | 8 | 72 +(.1 gm. MEOH) | 20 | 5 | 180 | — | 23 |

*Different batches, but made in the manner of Examples 1 and 3, respectively.
**8 grams of the wet solid of Example 17.
***32 grams of the dioxane slurry of Example 18.

As seen by Table II, the oil soluble hydroxylated polymers of the Table were effective as sludge dispersants in a lube oil. Thus, Example 22 reacted 200 grams of a lube oil solution containing 14 grams of the halogenated polymer of Example 15 in 186 grams of the Solvent 100 Neutral (S100N) lubricating oil with 8 grams of the wet sodium salt of pentaerythritol (Na-PE) prepared according to Example 17, for 17 hours at 145°C., which gave an oil solution of the hydroxylated polymer and precipitated NACl (which was separated out by centrifuging). The hydroxylated polymer, when tested for Dispersancy, gave a reading of 60% of the blank, thereby indicating good dispersancy, (readings below 100% of blank indicate dispersancy, and the lower the % of blank, the greater the degree of dispersancy). As previously described, this dispersancy test centrifuges a used automotive crankcase oil to clear it of existing sludge, then heats in an oven at 280°F., samples of the cleared used oil with the dispersant, so as to oxidize the oil in the presence of the dispersant, followed by centrifuging and washing to remove oil, to see how much new sludge centrifuges out in the presence of the dispersant. The blank is a similar sample of the cleared oil, but without dispersant, which is also heated and then the new sludge that forms is also separated by centrifugation. By comparing the weight of centrifuged sludge of the blank, with the weight of the centrifuged sludge of the dispersant-containing sample, the effectiveness of the dispersant in holding the sludge suspended in the oil is determined. In Example 22, the dispersant gave only 60% as much centrifuged sludge as the blank, which on the basis of prior experience with this test indicates a good dispersant. The other Examples of Table II also indicate good dispersants.

Example 37 used 3 grams of the sodium pentaerythritol of Example 20, along with 0.5 grams of dimethyl formamide (DMF), which was added as a promoter to hasten the reaction on the idea that it would increase the polarity of the solvent. Example 38 used 3 grams of the sodium pentaerythritol of Example 20 with .1 gram of methyl alcohol (MEOH) as a promoter, while Example 39 used 72 grams of the sodium pentaerythritol with 0.1 gram of MEOH.

In some cases, the hydroxyl numbers of the resulting oil solution of the hydroxylated polymer were obtained. Thus, in Example 23, it had a hydroxyl number of 15.2 milligrams of KOH per gram of the oil solution containing the hydroxylated polymer.

EXAMPLE 40

2000 grams of 7 wt. % solution of Polymer A chlorinated at 45°–50°C. to a 1.68 wt. % level in Solvent 100 Neutral oil was reacted with 16 grams of the sodium salt of pentaerythritol (Example 20) for a total of about 5 hours at about 180°C. while sparging with nitrogen and vigorously stirring, following by dilution with hexane, centrifugation and evaporating the clear supernatent hexane solution on a steam bath while sparging with nitrogen. A clear yellow concentrate resulted. This concentrate gave a dispersancy test of 29.4 % of the blank in the aforedescribed dispersancy test.

A fully formulated 10W-30 SAE crankcase lubricating oil containing ashless dispersant, antioxidants, and about 6.3 wt. % of a V.I. improver concentrate containing about 7 wt. % of ethylene-propylene copolymer (which was not hydroxylated) as a viscosity index improver, was tested in a Sequence V-C engine test. For comparison, the same formulation was tested, but in place of the ethylene-propylene copolymer concentrate there was used about 6.2 wt. % of the concentrate of Example 40 described above.

The Sequence V-C is definitively described in "Multicylinder Test Sequences for Evaluating Automotive Engine Oils," ASTM Special Technical Publication 315F, 1973, page 133 ff. The V-C test evaluates the ability of an oil to keep sludge in suspension and to keep varnish deposits from the pistons and other parts. The test results given below clearly show the superior ability of a test oil incorporating a dispersant-viscosity index improver of this invention.

TABLE III

|  | MS - V-C Test Results | | |
| --- | --- | --- | --- |
|  | Sludge | Piston Skirt Varnish | Total Varnish |
| Oil with dispersant V.I. improver of Example 40 | 9.1 | 8.2 | 8.3 |
| Oil with ethylene-propylene V.I. improver | 8.0 | 8.2 | 7.6 |
| Passing criteria for test | 8.5 | 8.0 | 8.0 |

In the above test, the ratings are on a scale of 0 to 10, where 0 is extremely poor, and 10 is completely clean. As seen by the above data in Table III, the use of hydroxylated V.I. improving polymers of the invention, in place of a non-hydroxylated polymer, significantly improved the performance of the oil composition in keeping the engine clean.

What is claimed is:

1. A composition comprising a major proportion of a lubricant or a normally liquid hydrocarbon fuel and dissolved therein a minor, dispersant and/or V.I. improving proportion of an oil-soluble hydroxylated olefin polymer, said hydroxylated olefin polymer having sludge dispersing ability and a molecular weight in the range of about 1,000 to 500,000 $\bar{M}_n$, said hydroxylated olefin polymer containing about .1 to about 15.0 wt. % oxygen, based on the weight of said hydroxylated polymer, wherein said hydroxylated polymer is the reaction product of a halogen containing polymer having 0.1 to 7.0 wt. % halogen, and an alkali metal salt of a polyol, wherein said halogen containing polymer is selected from the group consisting of:
   a. halogenated copolymer of ethylene and a $C_3$ to $C_{18}$ straight or branched chain α-olefin;
   b. halogenated terpolymer of ethylene, a $C_3$ to $C_{18}$ straight or branched chain α-olefin and a $C_5$ to $C_{14}$ acyclic or alicyclic non-conjugated diolefin; and
   c. terpolymer of ethylene, a $C_3$ to $C_{18}$ straight or branched chain α-olefin and a $C_5$ to $C_{14}$ acyclic or alicyclic halo-olefin containing 1 to 2 halogens per halo-olefin molecule;
   wherein said polymers of (a), (b), and (c) comprise in the range of about 30 to 85 mole % ethylene, about 15 to 70 mole % of said $C_3$–$C_{18}$ alpha olefin, and up to about 20 mole % of said diolefin or said halo-olefin,
   wherein said polyol has the formula:

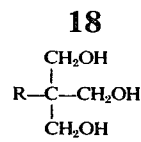

wherein R is selected from the group consisting of hydrogen, $C_1$ to $C_{20}$ straight or branched chain alkyl radicals, methylol, hydroxy alkyl and pentaerythritol radicals; and wherein said polyol has one hydroxy group metallated to form said alkali metal salt of a polyol.

2. A composition according to claim 1, comprising a major amount of mineral lubricating oil containing in the range of about 0.1 to 7.0 wt. % of said oil soluble hydroxylated olefin polymer, wherein said molecular weight is in the range of about 10,000 to 200,000, said oxygen content is about 0.2 to 10.0 wt. % oxygen, and said alpha olefin is a $C_3$ to $C_8$ olefin.

3. A composition according to claim 2, wherein said halogen containing polymer is a terpolymer of ethylene, propylene and said diolefin.

4. A composition according to claim 3, wherein said diolefin is selected from the group consisting of 5-ethylidene norbornene-2 and 1,4-hexadiene.

5. A composition according to claim 2, wherein said alkali metal salt is sodium pentaerythritol.

6. A composition according to claim 4, wherein said polyol is pentaerythritol, said molecular weight is in the range of about 10,000 to 100,000, and said lubricating oil is a mineral lubricating oil.

7. An oil concentrate comprising about 90 to 45 parts by weight of a mineral lubricating oil and about 10 to 45 parts by weight of an oil-soluble hydroxylated olefin polymer, said hydroxylated olefin polymer having sludge dispersing ability and a molecular weight in the range of about 1000 to 500,000 $\bar{M}_n$, said hydroxylated olefin polymer containing about 0.1 to about 15.0 wt. % oxygen, based on the weight of said hydroxylated polymer, wherein said hydroxylated polymer is the reaction product of a halogen containing polymer having 0.1 to 7.0 wt. % halogen, and an alkali metal salt of a polyol,
   wherein said halogen containing polymer is selectd from the group consisting of:
   a. halogenated copolymer of ethylene and a $C_3$ to $C_{18}$ straight or branched chain α-olefin;
   b. halogenated terpolymer of ethylene, a $C_3$ to $C_{18}$ straight or branched chain α-olefin and a $C_5$ to $C_{14}$ acyclic or alicyclic non-conjugated diolefin; and
   c. terpolymer of ethylene, a $C_3$ to $C_{18}$ straight or branched chain α-olefin and a $C_5$ to $C_{14}$ acyclic or alicyclic halo-olefin containing 1 to 2 halogoens per halo-olefin molecule;
   wherein said polymers of (a), (b) and (c) comprise in the range of about 30 to 85 mole % ethylene, about 15 to 70 mole % of said $C_3$–$C_{18}$ alpha olefin, and up to about 20 mole % of said diolefin or said halo-olefin,
   wherein said polyol has the formula:

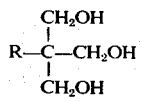

wherein R is selected from the group consisting of hydrogen, $C_1$ to $C_{20}$ straight or branched chain alkyl radicals, methylol, hydroxy alkyl and pentaerythritol radicals; and wherein said polyol has one hydroxy group metallated to form said alkali metal salt of a polyol.

* * * * *